(12) United States Patent
Ogawa et al.

(10) Patent No.: US 7,363,906 B2
(45) Date of Patent: Apr. 29, 2008

(54) CONTROL SYSTEM FOR INTERNAL COMBUSTION ENGINE

(75) Inventors: Ken Ogawa, Saitama-ken (JP); Toshinari Shinohara, Saitama-ken (JP); Tetsuaki Nakano, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 46 days.

(21) Appl. No.: 11/526,726

(22) Filed: Sep. 26, 2006

(65) Prior Publication Data
US 2007/0074505 A1   Apr. 5, 2007

(30) Foreign Application Priority Data
Sep. 30, 2005   (JP)   ............................. 2005-288063
Sep. 30, 2005   (JP)   ............................. 2005-288065

(51) Int. Cl.
*F01N 3/36*   (2006.01)
(52) U.S. Cl. .................. 123/299; 123/698; 701/104; 60/284; 60/300
(58) Field of Classification Search ............... 123/295, 123/299, 698; 701/104; 60/284, 300
See application file for complete search history.

(56) References Cited
U.S. PATENT DOCUMENTS

| | | | | |
|---|---|---|---|---|
| 5,207,058 A | * | 5/1993 | Sasaki et al. ................. | 60/284 |
| 5,479,775 A | * | 1/1996 | Kraemer et al. ............... | 60/274 |
| 5,826,425 A | * | 10/1998 | Rossi et al. ................... | 60/274 |
| 5,839,275 A | * | 11/1998 | Hirota et al. ................. | 60/285 |
| 5,956,942 A | * | 9/1999 | Sebastiano et al. ........... | 60/274 |
| 6,536,209 B2 | * | 3/2003 | Fluga et al. .................. | 60/284 |
| 6,865,880 B2 | * | 3/2005 | Iihoshi et al. ............... | 123/299 |

* cited by examiner

*Primary Examiner*—Erick Solis
(74) *Attorney, Agent, or Firm*—Arent Fox LLP

(57) ABSTRACT

A control system for an internal combustion engine, which can determine just enough amounts of demanded combustion fuel and auxiliary fuel during execution of auxiliary fuel supply, for improvement of fuel economy and drivability and the emission-reducing capability of a catalyst. The control system carries out auxiliary fuel supply for a cylinder during a predetermined time period within the expansion and exhaust strokes, to control the catalyst to a predetermined state for its emission-reducing capability. The control system calculates a whole demanded fuel amount to make oxygen concentration in exhaust gases equal to a predetermined value for controlling the catalyst to the state during auxiliary fuel supply, determines the amount of demanded combustion fuel to be supplied to obtain engine output, and determines the auxiliary fuel amount based on the difference between the whole demanded fuel amount and the demanded combustion fuel amount.

5 Claims, 10 Drawing Sheets

| NE<br>PMCMD | NE1 · · · · · · · · · · NEj |
|---|---|
| PMCMD1 | $KCAT11$ · · · · · · · · · · $KCAT1j$ |
| ⋮ | ⋮ |
| PMCMDi | $KCATi1$ · · · · · · · · · · $KCATij$ |

F I G. 6

| NE<br>PMCMD | NE1 · · · · · · · · · · NEj |
|---|---|
| PMCMD1 | $\tau 11$ · · · · · · · · · · $\tau 1j$ |
| ⋮ | ⋮ |
| PMCMDi | $\tau i1$ · · · · · · · · · · $\tau ij$ |

F I G. 7

| NE\PMCMD | NE1 · · · · · · · · · · NEj |
|---|---|
| PMCMD1 | $\alpha 11$ · · · · · · · · · · $\alpha 1j$ |
| ⋮ | ⋮             ⋮ |
| PMCMDi | $\alpha i1$ · · · · · · · · · · $\alpha ij$ |

F I G. 8

| NE\PMCMD | NE1 · · · · · · · · · · NEj |
|---|---|
| PMCMD1 | $\beta 11$ · · · · · · · · · · $\beta 1j$ |
| ⋮ | ⋮             ⋮ |
| PMCMDi | $\beta i1$ · · · · · · · · · · $\beta ij$ |

| AP \ NE | NE1 ············ NEj |
|---|---|
| AP1 | PMCMD11 ·········· PMCMD1j |
| ⋮ | ⋮ |
| APi | PMCMDi1 ·········· PMCMDij |

CONTROL SYSTEM FOR INTERNAL COMBUSTION ENGINE

BACKGROUND OF THE INVENTION

1. Field of the Invention

This invention relates to a control system for an internal combustion engine, which carries out auxiliary fuel supply for supplying fuel to a cylinder as auxiliary fuel over a predetermined time period within a time period from an expansion stroke through an exhaust stroke of the engine, so as to control a catalyst for reducing exhaust emissions to a predetermined state for causing the catalyst to exhibit its emission-reducing capability, and a control system for an internal combustion engine, which supplies fuel to a cylinder and performs EGR for causing part of combustion gases generated by combustion to be present in the cylinder, by an EGR device.

2. Description of the Related Art

Conventionally, a control system of the first-mentioned kind has been disclosed in Japanese Laid-Open Patent Publication (Kokai) No. H11-107813. The internal combustion engine is of an in-cylinder injection type for directly injecting fuel into a cylinder, and a NOx catalyst is disposed in an exhaust pipe thereof, for reducing exhaust emissions. When the amount of a sulfur component adsorbed by the NOx catalyst is large, in order to cause the sulfur component to be released from the NOx catalyst to restore the emission-reducing capability thereof, the control system carries out not only normal fuel injection for the engine power output but also expansion stroke injection for injecting fuel during the expansion stroke. This causes unburned fuel to be contained in exhaust gases and be burned in the exhaust pipe, whereby the temperature of the NOx catalyst is raised to such a high temperature as enables the NOx catalyst to release the sulfur component adsorbed thereby. Further, the total sum of the amount of fuel injected for the engine power output and the amount of fuel injected during the expansion stroke is calculated such that exhaust gases are made rich, and the ratio between the two amounts is determined according to temperature required by the NOx catalyst and the engine speed. The control system causes the sulfur component to be released from the NOx catalyst by the above two control operations for adding unburned fuel and making exhaust gases rich, to thereby prevent the NOx catalyst from being degraded in the emission-reducing capability thereof.

In the conventional control system, however, as described above, the ratio between the amount of fuel injected for the engine power output and the amount of fuel injected during the expansion stroke is determined according to the temperature required by the NOx catalyst and the engine speed, during execution of expansion stroke injection, and therefore the amount of fuel injected for the engine power output sometimes becomes too small or too large with respect to the intake air amount at the time. In such a case, there is a fear that fuel economy is degraded during execution of expansion stroke injection, and the engine power output cannot be obtained, as desired, resulting in degraded drivability.

Further, when the conventional control system is combined with an EGR device for recirculating part of exhaust gases into the intake pipe of the engine, and expansion stroke injection and the exhaust gas-recirculating operation of the EGR device are performed concurrently, there occur the following inconveniences: In this case, part of unburned fuel caused to be contained in exhaust gases by expansion stroke injection flows into the cylinder after being recirculated into the intake pipe by the recirculating operation of the EGR device. This causes a substantial increase in the amount of fuel burned in the cylinder. The conventional control system only determines the total sum of the amount of fuel injected for the engine power output and the amount of fuel injected during the expansion stroke such that exhaust gases are made rich, so that if the amount of fuel burned in the cylinder substantially increases, the output torque of the engine can be fluctuated, resulting in degraded drivability.

SUMMARY OF THE INVENTION

It is a first object of the present invention to provide a control system for an internal combustion engine, which is capable of properly determining both a demanded combustion fuel amount for the engine power output and an auxiliary fuel amount for enabling a catalyst to exhibit its emission-reducing capability, as respective just enough amounts, during execution of auxiliary fuel supply, thereby making it possible to improve fuel economy and drivability, and cause the catalyst to properly exhibit its emission-reducing capability.

It is a second object of the present invention to provide a control system for an internal combustion engine, which is capable of obtaining a stable output torque of the engine, thereby improving drivability, even when supply of fuel to a cylinder over a predetermined time period within a time period from the expansion stroke through the exhaust stroke and EGR by an EGR device are concurrently carried out.

To attain the above first object, in a first aspect of the present invention, there is provided a control system for an internal combustion engine, which carries out auxiliary fuel supply for supplying fuel to a cylinder as auxiliary fuel over a predetermined time period within a time period from an expansion stroke through an exhaust stroke of the engine, so as to control a catalyst for reducing exhaust emissions to a predetermined state for causing the catalyst to exhibit its emission-reducing capability, comprising whole demanded fuel amount-calculating means for calculating a whole demanded fuel amount such that concentration of oxygen in exhaust gases becomes equal to predetermined oxygen concentration capable of controlling the catalyst to the predetermined state during execution of the auxiliary fuel supply, demanded combustion fuel amount-determining means for determining a demanded amount of combustion fuel to be supplied to the cylinder for a power output of the engine, and auxiliary fuel amount-determining means for determining an amount of auxiliary fuel based on a difference between the whole demanded fuel amount and the demanded amount of combustion fuel.

With the configuration of the control system according to the first aspect of the present invention, the whole demanded fuel amount-calculating means calculates the whole demanded fuel amount such that the concentration of oxygen in exhaust gases becomes equal to the predetermined oxygen concentration capable of controlling the catalyst to the predetermined state for causing the catalyst to exhibit its emission-reducing capability. Further, the demanded combustion fuel amount-determining means determines the demanded amount of combustion fuel to be supplied to the cylinder for the engine power output. The auxiliary fuel amount-determining means determines the amount of auxiliary fuel based on the difference between the whole demanded fuel amount and the demanded amount of combustion fuel (the demanded combustion fuel amount). Thus, the demanded combustion fuel amount for obtaining the engine power output is determined independently of the auxiliary fuel amount. Therefore, the demanded combustion fuel amount can be properly determined as a just enough amount without being adversely affected by the auxiliary fuel amount, and hence it is possible to improve fuel economy and drivability.

Further, since the auxiliary fuel is supplied to the cylinder over the predetermined time period within the time period from the expansion stroke through the exhaust stroke of the engine, the auxiliary fuel is not burned in the engine, but it is burned after being emitted from the engine together with exhaust gases generated by burning fuel for the engine power output. According to the first aspect of the present invention, the auxiliary fuel amount is determined based on the difference between the whole demanded fuel amount and the demanded combustion fuel amount calculated as above, and hence the total sum of the demanded combustion fuel amount and the auxiliary fuel amount is determined such that the concentration of oxygen in exhaust gases becomes equal to the predetermined oxygen concentration capable of controlling the catalyst to the predetermined state for causing the catalyst to exhibit its emission-reducing capability. This makes it possible to determine the auxiliary fuel amount as a just enough amount, and the oxygen concentration of exhaust gases generated by burning the demanded combustion fuel amount of fuel for the engine power output and the auxiliary fuel amount of fuel can be properly controlled to the predetermined oxygen concentration. This makes it possible to control the catalyst to the predetermined state, thereby making it possible to cause the catalyst to properly exhibit its emission-reducing capability.

Preferably, the engine has a plurality of combustion modes for burning mixtures having respective air-fuel ratios different from each other, and the auxiliary fuel supply is carried out so as to raise temperature of the catalyst, the control system further comprising operating condition-detecting means for detecting an operating condition of the engine, combustion mode-determining means for determining one of the combustion modes to be the combustion mode, according to the detected operating condition, and combustion mode switching-inhibiting means for inhibiting switching of the combustion mode by the combustion mode-determining means during execution of the auxiliary fuel supply.

With this configuration of the preferred embodiment, the combustion mode-determining means determines one of the combustion modes to be the combustion mode, according to the detected operating condition, and during execution of the auxiliary fuel supply, the combustion mode switching-inhibiting means inhibits switching of the combustion mode by the combustion mode-determining means. In the preferred embodiment, the air-fuel ratio of burned mixtures is different between the combustion modes, and the temperature of exhaust gases varies accordingly. Therefore, the auxiliary fuel amount necessary for raising the temperature of the catalyst varies from one combustion mode to another. For this reason, there is a fear that when the combustion mode is switched during supply of auxiliary fuel, the amount of the supplied auxiliary fuel becomes too large or too small with respect to a required fuel amount. In the former case, fuel economy is degraded, and in the latter case, the temperature of the catalyst cannot be raised high enough. According to the preferred embodiment, the switching of the combustion mode is inhibited during execution of auxiliary fuel supply to thereby maintain the temperature of exhaust gases, as described above, which makes it possible to supply a just enough amount of auxiliary fuel, and hence to achieve excellent fuel economy and appropriately raise the temperature of the catalyst.

To attain the second object, in a second aspect of the present invention, there is provided a control system for an internal combustion engine, which supplies fuel to a cylinder and performs EGR for causing part of combustion gases generated by combustion to be present in the cylinder, by an EGR device, comprising first supply fuel amount-determining means for determining an amount of first supply fuel to be supplied to the cylinder for a power output of the engine, second supply fuel amount-determining means for determining an amount of second supply fuel to be supplied to the cylinder over a predetermined time period within a time period from an expansion stroke through an exhaust stroke of the engine, additional fuel amount-calculating means for calculating an amount of fuel which is caused to be present in the cylinder in accordance with the EGR performed by the EGR device, out of the supplied second supply fuel, as an additional fuel amount, and correction means for correcting the determined amount of the first supply fuel based on the calculated additional fuel amount.

With the configuration of the control system according to the second aspect of the present invention, the first supply fuel amount-determining means determines the amount of first supply fuel to be supplied to the cylinder so as to obtain the engine power output, and the second supply fuel amount-determining means determines the amount of second supply fuel to be supplied to the cylinder over the predetermined time period within the time period from the expansion stroke through the exhaust stroke of the engine. Further, the additional fuel amount-calculating means calculates the amount of fuel which is caused to be present in the cylinder in accordance with the EGR performed by the EGR device, out of the supplied second supply fuel, as an additional fuel amount, and the correction means corrects the determined amount of the first supply fuel based on the calculated additional fuel amount.

As described above, the amount of the first supply fuel to be supplied to the cylinder for the engine power output is corrected according to the amount of additional fuel caused to be present in the cylinder by the EGR, and therefore it is possible to avoid a substantial increase in the amount of fuel burned in the engine by the amount of the additional fuel, thereby making it possible to properly control the amount of fuel burned in the engine. This makes it possible to obtain a stable output torque of the engine, even when the supply of fuel to the cylinder over the predetermined time period within the time period from the expansion stroke through the exhaust stroke and the EGR of the EGR device are concurrently carried out, whereby it is possible to improve drivability.

Preferably, the control system further comprises dynamic characteristic parameter-calculating means for calculating a dynamic characteristic parameter indicative of dynamic characteristics exhibited by the second supply fuel supplied to the cylinder until the second supply fuel is caused to be present in the cylinder, and the additional fuel amount-calculating means calculates the additional fuel amount based on the calculated dynamic characteristic parameter.

With this configuration of the preferred embodiment, the dynamic characteristic parameter-calculating means calculates the dynamic characteristic parameter indicative of the dynamic characteristics exhibited by the second supply fuel supplied to the cylinder until the second supply fuel is caused to be present in the cylinder, and the additional fuel amount-calculating means calculates the additional fuel amount based on the calculated dynamic characteristic parameter. This makes it possible to properly calculate the additional fuel amount in a fine-grained manner according to the actual behavior of the second supply fuel exhibited until it is caused to be present in the cylinder. Therefore, it is possible to obtain stable output torque of the engine and improve drivability more effectively.

More preferably, the EGR device is formed by an external EGR device which executes external EGR for recirculating part of combustion gases emitted from the engine into the cylinder via an EGR passage, and the dynamic characteristic parameter includes at least one of dead time it takes for the second supply fuel to be recirculated to the cylinder, a direct inflow ratio which represents a ratio of an amount of fuel which is directly recirculated into the cylinder, out of the second supply fuel having flowed into the EGR passage, to the amount of the second supply fuel having flowed into the EGR passage, and an indirect inflow ratio which represents a ratio of an amount of fuel which is recirculated into the cylinder, out of the second supply fuel staying within the EGR passage, to the amount of the second supply fuel staying within the EGR passage.

With this configuration of the preferred embodiment, the additional fuel amount is calculated based on at least one of the dead time it takes for the second supply fuel to be recirculated to the cylinder, the direct inflow ratio which represents the ratio of the amount of fuel which is directly recirculated into the cylinder, out of the second supply fuel having flowed into the EGR passage, to the amount of the second supply fuel having flowed into the EGR passage, and the indirect inflow ratio which represents the ratio of the amount of fuel which is recirculated into the cylinder, out of the second supply fuel staying within the EGR passage, to the amount of the second supply fuel staying within the EGR passage. In the preferred embodiment, since part of the combustion gases emitted from the engine is recirculated to the cylinder via the EGR passage, the dead time is produced before the second supply fuel emitted from the engine together with the combustion gases is recirculated to the cylinder. Further, part of the second supply fuel having flowed into the EGR passage is directly recirculated to the cylinder, and the remainder thereof is recirculated to the cylinder after temporarily staying within the EGR passage.

According to the preferred embodiment, as described above, the additional fuel amount is calculated based on the dead time it takes for the second supply fuel to be recirculated to the cylinder, the direct inflow ratio and the indirect inflow ratio, and therefore even when the external EGR is performed concurrently with the supply of additional fuel to the cylinder, it is possible to properly calculate the additional fuel amount while causing the above-described actual behavior of the second supply fuel to be reflected on the calculation.

The above and other objects, features, and advantages of the present invention will become more apparent from the following detailed description taken in conjunction with the accompanying drawings.

DETAILED DESCRIPTION OF PREFERRED EMBODIMENTS

Figure 1:
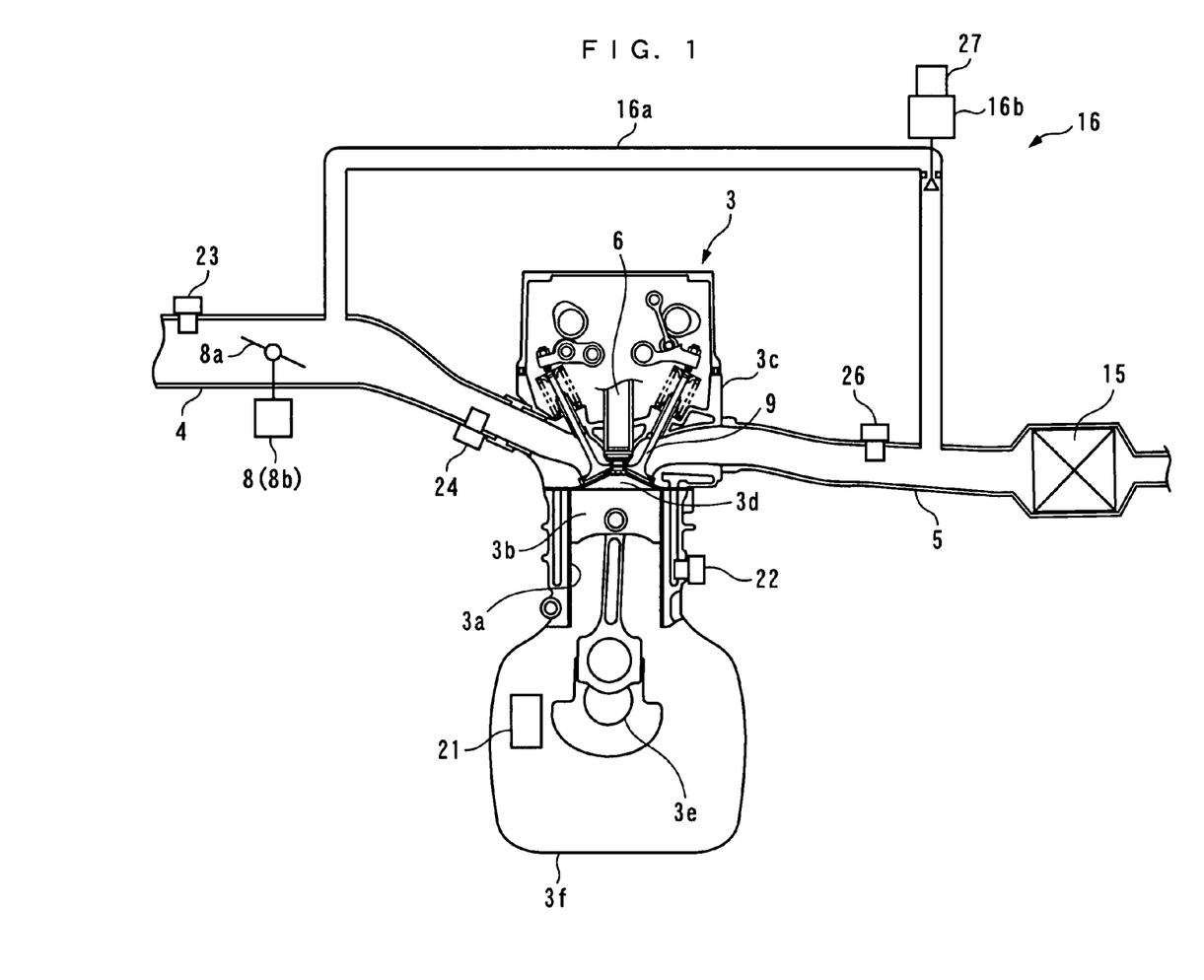
FIG. 1 is a schematic diagram of an internal combustion engine to which is applied a control system according to an embodiment of the present invention.

The present invention will now be described in detail with reference to the drawings showing a preferred embodiment thereof. Referring first to FIG. 1, there is schematically shown an internal combustion engine to which is applied a control system according to an embodiment of the present invention. The internal combustion engine (hereinafter simply referred to as "the engine") 3 is e.g. an in-line four-cylinder gasoline engine installed on a vehicle, not shown.

Defined between a piston 3b and a cylinder head 3c of each cylinder 3a is a combustion chamber 3d (only one set of these components is shown). Further, to the cylinder head 3c are connected an intake pipe 4 and an exhaust pipe 5, and a fuel injection valve (hereinafter referred to as "the injector") 6 and a spark plug 7 (see FIG. 2) are mounted through the cylinder head 3c in a manner facing the combustion chamber 3d. The injector 6 is configured such that it directly injects fuel in the vicinity of the spark plug 7 within the cylinder 3a. That is, the engine 3 is a spray-guided direct injection engine. Further, a valve-opening time period and valve-opening timing of the injector 6, and ignition timing of the spark plug 7 are controlled by drive signals delivered from an ECU 2 of the control system 1.

The engine 3 is provided with a crank angle sensor 21 (operating condition-detecting means) and an engine coolant temperature sensor 22. The crank angle sensor 21 is comprised of a magnet rotor and an MRE pickup (neither of which is shown), and delivers a CRK signal and a TDC signal, which are both pulse signals, to the ECU 2 in accordance with rotation of a crankshaft 3e.

Each pulse of the CRK signal is generated whenever the crankshaft 3e rotates through a predetermined crank angle (e.g. 30°). The ECU 2 calculates rotational speed NE of the engine 3 (hereinafter referred to as "the engine speed NE") based on the CRK signal. The TDC signal indicates that the piston 3b of each cylinder 3a is at a predetermined crank angle position in the vicinity of the top dead center (TDC) at the start of the suction stroke thereof, and in the case of the four-cylinder engine of the illustrated example, it is delivered whenever the crankshaft 3e rotates through 180°.

The engine coolant temperature sensor 22 detects the temperature TW of an engine coolant circulating through the cylinder block 3f of the engine 3 (hereinafter referred to as "the engine coolant temperature TW), and delivers a signal indicative of the sensed engine coolant temperature TW to the ECU 2.

In the intake pipe 4, there are arranged an air flow sensor 23, a throttle valve mechanism 8, and an intake air temperature sensor 24, from upstream to downstream in the mentioned order at respective locations of the intake pipe 4. The air flow sensor 23 detects the flow rate GIN of fresh air flowing through the intake pipe 4 (hereinafter referred to as "the fresh air flow rate GIN"), and delivers a signal indicative of the sensed fresh air flow rate GIN to the ECU 2. The intake air temperature sensor 24 detects the temperature TA of air drawn into each cylinder 3a (hereinafter referred to as "the intake air temperature TA"), and delivers a signal indicative of the sensed intake air temperature TA to the ECU 2.

The throttle valve mechanism 8 includes a throttle valve 8a, and a TH actuator 8b that actuates the throttle valve 8a to open and close the same. The throttle valve 8a is pivotally disposed within the intake pipe 4 such that the degree of opening thereof is changed by the pivotal motion thereof to thereby change the fresh air flow rate GIN in the intake pipe 4. The TH actuator 8b is implemented by a combination of a motor, not shown, and a gear mechanism, not shown, and is driven by a drive signal from the ECU 2, whereby the degree TH of opening of the throttle valve 8a (hereinafter referred to as "the throttle valve opening TH") is controlled. The throttle valve opening TH is detected by a throttle valve opening sensor 25, and a signal indicative of the sensed throttle valve opening TH is delivered to the ECU 2.

A LAF sensor 26 and a catalytic device 15 are provided in the exhaust pipe 5 at respective locations in the mentioned order from the upstream side. The LAF sensor 26 linearly detects the concentration of oxygen in exhaust gases flowing through the exhaust pipe 5, in a broad air-fuel ratio range from a rich region richer than a stoichiometric air-fuel ratio to a very lean region, and delivers a signal indicative of the sensed oxygen concentration to the ECU 2. The ECU 2 calculates an actual air-fuel ratio KACT indicative of an actual air-fuel ratio of a mixture burned in the combustion chamber 3d, based on the oxygen concentration sensed by the LAF sensor 26. In this case, the actual air-fuel ratio KACT is calculated as an equivalent ratio. Further, the catalytic device 15 is a combination of a three-way catalyst and a NOx adsorbing catalyst, and eliminates NOx, CO and HC contained in exhaust gases exhausted from the engine 3.

Further, the engine 3 is provided with an EGR device 16 (external EGR device). The EGR device 16 carries out external EGR for recirculating exhaust gases from the exhaust pipe 5 into the intake pipe 4 so as to reduce the amount of NOx generated by combustion, and is comprised of an EGR pipe 16a (EGR passage), connecting between a portion of the exhaust pipe 5 upstream of the catalytic device 15 and a portion of the intake pipe 4 downstream of the throttle valve mechanism 8 and an EGR control valve 16b for opening and closing the EGR pipe 16a.

The EGR control valve 16b is a linear solenoid valve that linearly changes a valve lift thereof (hereinafter referred to as "the EGR lift") according to the duty ratio EGR_DUTY of an electric current supplied based on control by the ECU 2, to thereby change the degree of opening of the EGR pipe 16a, that is, the exhaust gas recirculation rate (hereinafter referred to as "the external EGR amount"). Further, the EGR control valve 16b has an EGR lift sensor 27 mounted thereto. The EGR lift sensor 27 detects an actual EGR lift LACT of the EGR control valve 16b, and delivers a signal indicative of the sensed actual EGR lift LACT to the ECU 2.

Furthermore, an atmospheric pressure sensor 28 detects atmospheric pressure PA to deliver a signal indicative of the sensed atmospheric pressure PA to the ECU 2, and an accelerator pedal opening sensor 29 detects the amount AP of operation of the accelerator pedal (hereinafter referred to as "the accelerator pedal opening AP"), and delivers a signal indicative of the sensed accelerator pedal opening AP to the ECU 2.

Figure 2:
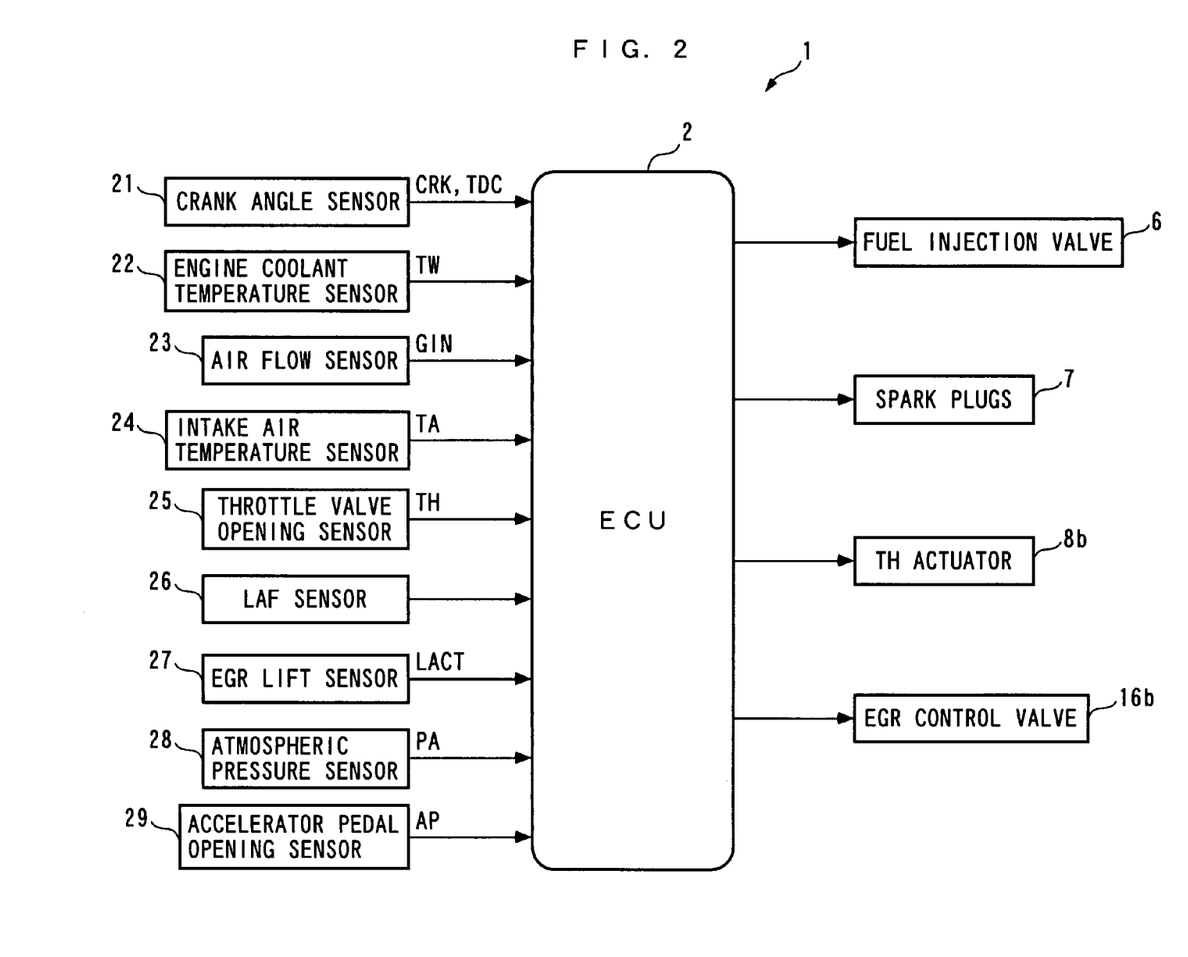
FIG. 2 is a schematic block diagram of the control system.

The ECU 2 is implemented by a microcomputer including an I/O interface, a CPU, a RAM, and a ROM. The ECU 2 determines an operating condition of the engine 3 based on the detection signals from the above-described sensors 21 to 29. Further, the ECU 2 determines the combustion mode of the engine 3 based on the determined operating condition, and executes a fuel injection control process for controlling fuel injection from the injector 6, including expansion stroke injection for injecting fuel during the expansion stroke of the engine 3, depending on the determined combustion mode. It should be noted that in the present embodiment, the ECU 2 corresponds to whole demanded fuel amount-calculating means, demanded combustion fuel amount-determining means, auxiliary fuel amount-determining means, operating condition-detecting means, combustion mode-determining means, combustion mode switching-inhibiting means, first supply fuel amount-determining means, second supply fuel amount-determining means, additional fuel amount-calculating means, correction means, and dynamic characteristic parameter-calculating means.

The combustion mode is determined according to the engine speed NE and the demanded torque PMCMD, and is basically set to a stratified combustion mode during a low-to-medium load operation, and otherwise to a homogeneous combustion mode. Further, in switching between these two types of combustion modes, the combustion mode is set to a two-stage fuel injection combustion mode. It should be noted that the demanded torque PMCMD is calculated by searching a map (not shown) according to the engine speed NE and the accelerator pedal opening AP.

In the stratified combustion mode, stratified combustion is carried out by performing fuel injection during the compression stroke of the engine 3. Further, the air-fuel ratio A/F of the mixture in the stratified combustion mode is controlled to an air-fuel ratio A/F (e.g. 27 to 60) far leaner than the stoichiometric air-fuel ratio by controlling the throttle valve 8a to a substantially fully-open state. On the other hand, in the homogeneous combustion mode, homogeneous combustion is carried out by performing fuel injection during the suction stroke of the engine 3. In this case, the air-fuel ratio A/F is controlled to a rich air-fuel ratio A/F (e.g. 12 to 22) by controlling the throttle valve 8a to a smaller degree of opening than the degree of opening thereof in the stratified combustion mode to thereby reduce the fresh air flow rate GIN. Further, in the two-stage fuel injection combustion mode, fuel is basically injected twice, i.e. once during the suction stroke and once during the compression stroke in one combustion cycle such that combustion is performed at a richer air-fuel ratio A/F (e.g. 12 to 22) than in the stratified combustion mode.

Figure 13:
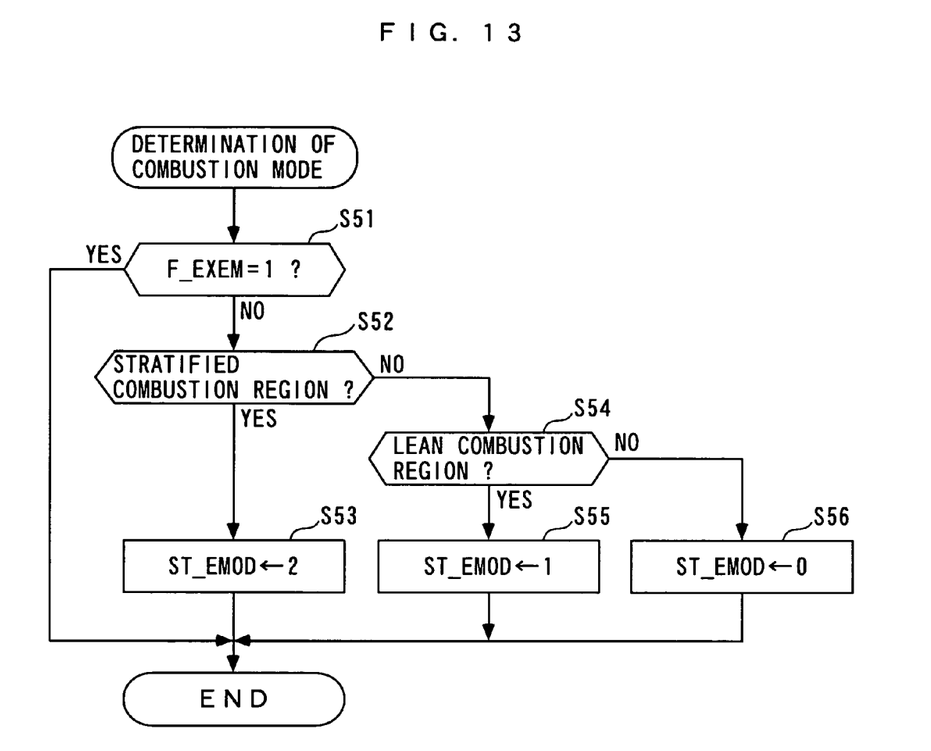
FIG. 13 is a flowchart of a combustion mode-determining process.

Further, the combustion mode is determined by a combustion mode-determining process shown in FIG. 13. The combustion mode-determining process is carried out whenever a predetermined time period (e.g. 10 msec) elapses. First, in a step 51 (shown as S51 in abbreviated form in FIG. 13; steps described hereinafter are also shown in abbreviated form), it is determined whether or not an expansion stroke injection flag F_EXEM is equal to 1.

Figure 11:
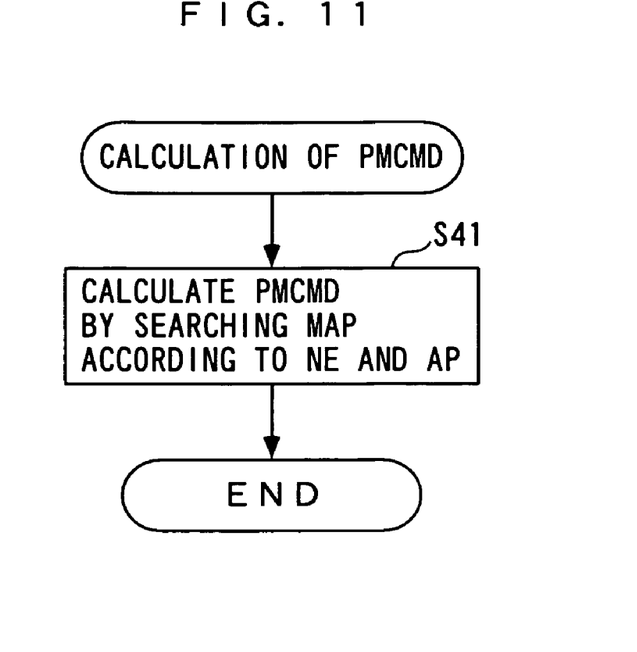
FIG. 11 is a flowchart of a PMCMD-calculating process.
Figure 12:
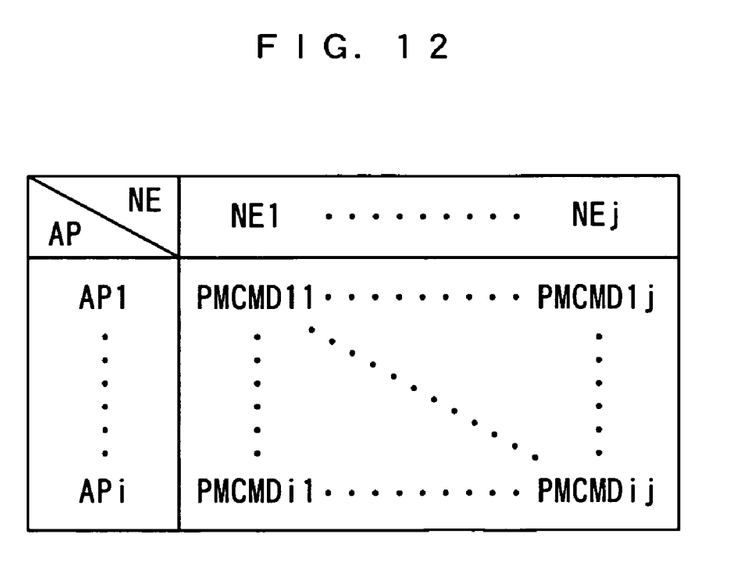
FIG. 12 is a diagram of an example of a PMCMD map for use in the FIG. 11 process.

As will be described hereinafter, the expansion stroke injection flag F_EXEM is set to 1 when executing conditions for performing expansion stroke injection are satisfied and expansion stroke injection is being executed. If the answer to this question is negative (NO), i.e. if expansion stroke injection is not being executed, the combustion mode is determined based on a combustion mode-determining map shown in FIG. 14 according to the engine speed NE and demanded torque PMCMD, in the following step 52 et seq. The demanded torque PMCMD is calculated by searching a PMCMD map shown in FIG. 12 according to the engine speed NE and the accelerator pedal opening AP in a step 41 in FIG. 11. The PMCMD map is configured such that as the engine speed NE is larger and/or the accelerator pedal opening AP is larger, the demanded torque PMCMD is set to a larger value.

Figure 14:
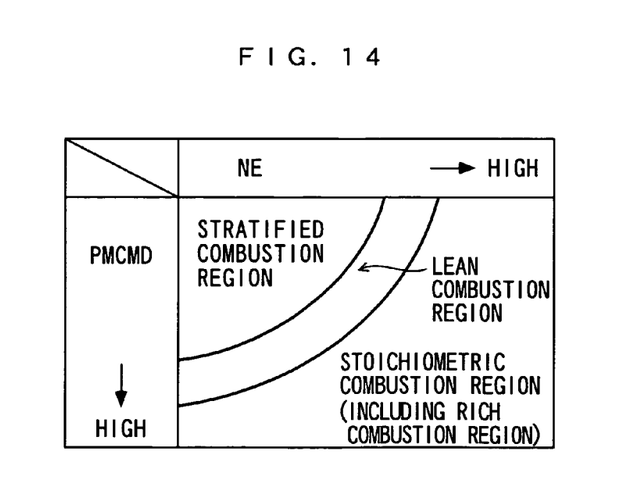
FIG. 14 is a diagram of an example of a combustion mode-determining map for use in the FIG. 13 process.

First, in the step 52, it is determined whether or not the engine speed NE and the demanded torque PMCMD are in a stratified combustion region in the combustion mode-determining map. If the answer to this question is affirmative (YES), the combustion mode is set to the stratified combustion mode, and to indicate the fact, a combustion mode monitor ST_EMOD is set to 2 (step 53). On the other hand, if the answer to the question of the step 52 is negative (NO), it is determined whether or not the engine speed NE and the demanded torque PMCMD are in a lean combustion region of a homogeneous combustion region (step 54). If the answer to this question is affirmative (YES), the combustion mode is set to the lean combustion mode, and the combustion mode monitor ST_EMOD is set to 1 (step 55).

On the other hand, if the answer to the question of the step 54 is negative (NO), i.e. if the engine speed NE and the demanded torque PMCMD are in a stoichiometric combustion region of the homogeneous combustion region, the combustion mode is set to a stoichiometric combustion mode, and the combustion mode monitor ST_EMOD is set to 0 (step 56). It should be noted that the stoichiometric combustion region is set such that it includes not only a region where the mixture is burned mainly at the stoichiometric air-fuel ratio but also a rich combustion region where the mixture is burned at an air-fuel ratio richer than the stoichiometric air-fuel ratio.

On the other hand, if the answer to the question of the step 51 is affirmative (YES), i.e. if expansion stroke injection is being executed, the present process is immediately terminated. As described hereinabove, during execution of expansion stroke injection, the combustion mode monitor ST_EMOD is held at a value set so far, whereby switching of the combustion mode is inhibited.

The expansion stroke injection is performed for raising the temperature of the catalyst of the catalytic device 15 to activate the same. By injecting fuel from the injector 6 into the associated cylinder 3a during the expansion stroke, unburned fuel is caused to be contained in exhaust gases, and is burned by the catalyst of the catalytic device 15, whereby the temperature of the catalytic device 15 is raised to activate the catalyst.

Further, the ECU 2 controls the external EGR amount. More specifically, first, a target EGR amount is calculated by searching a target EGR amount map (not shown) according to the engine speed NE and the demanded torque PMCMD. Then, the duty ratio EGR_DUTY of an electric current supplied to the EGR control valve 16b is calculated based on the calculated target EGR amount. Thus, the external EGR amount is controlled to the target EGR amount.

In the target EGR amount map, the target EGR amount is set to small values in a very low engine speed region where the engine speed NE is not higher than a first predetermined engine speed NE1 (e.g. 1000 rpm), and to large values in a low-to-medium engine speed region where the engine speed NE ranges up to second and third predetermined engine speeds NE2 and NE3 (e.g. 1500, and 2000 rpm, respectively). In a medium-to-high engine speed region where the engine speed NE is not lower than a fourth predetermined engine speed NE4 (e.g. 3500 rpm), the target EGR amount is set to a value of 0. The target EGR amount is thus set in order to prevent the combustion from being made further unstable by introduction of a large amount of external EGR gases in the very low engine speed region since combustion is not stable in the very low engine speed region, in order to reduce generation of NOx by introduction of a large amount of external EGR gases in the low-to-medium engine speed region since combustion is stable in the low-to-medium engine speed region, and in order to ensure a high and stable engine power output in the medium-to-high engine speed region. Further, the target EGR amount is set to a smaller value as the demanded torque PMCMD is larger. This is to ensure a high and stable engine power output.

Figure 3:
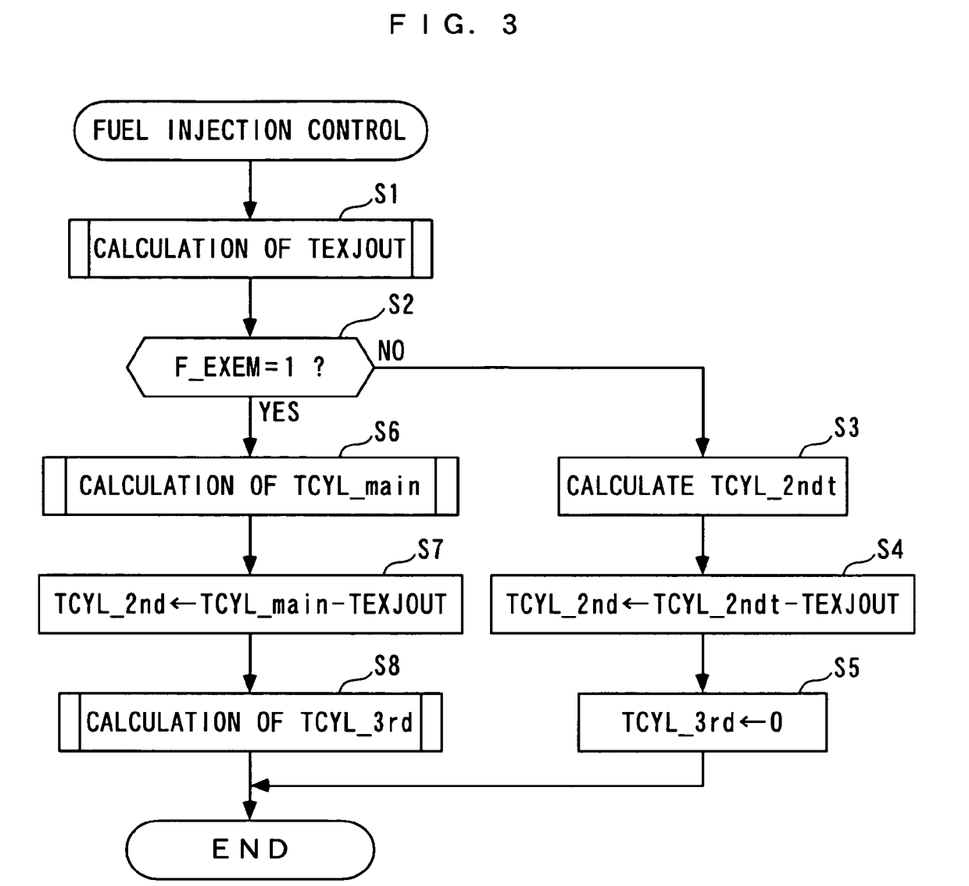
FIG. 3 is a flowchart of a fuel injection control process.

Next, a process for controlling the fuel injection from the injector 6 will be described with reference to FIG. 3. The present process is carried out in synchronism with generation of each TDC signal pulse. First, in a step 1, a recirculation fuel amount TEXJOUT is calculated. The recirculation fuel amount TEXJOUT represents the amount of fuel recirculated to the cylinder 3a by the external EGR of the EGR device 16, out of unburned fuel caused to be contained in exhaust gases by expansion stroke injection.

Figure 4:
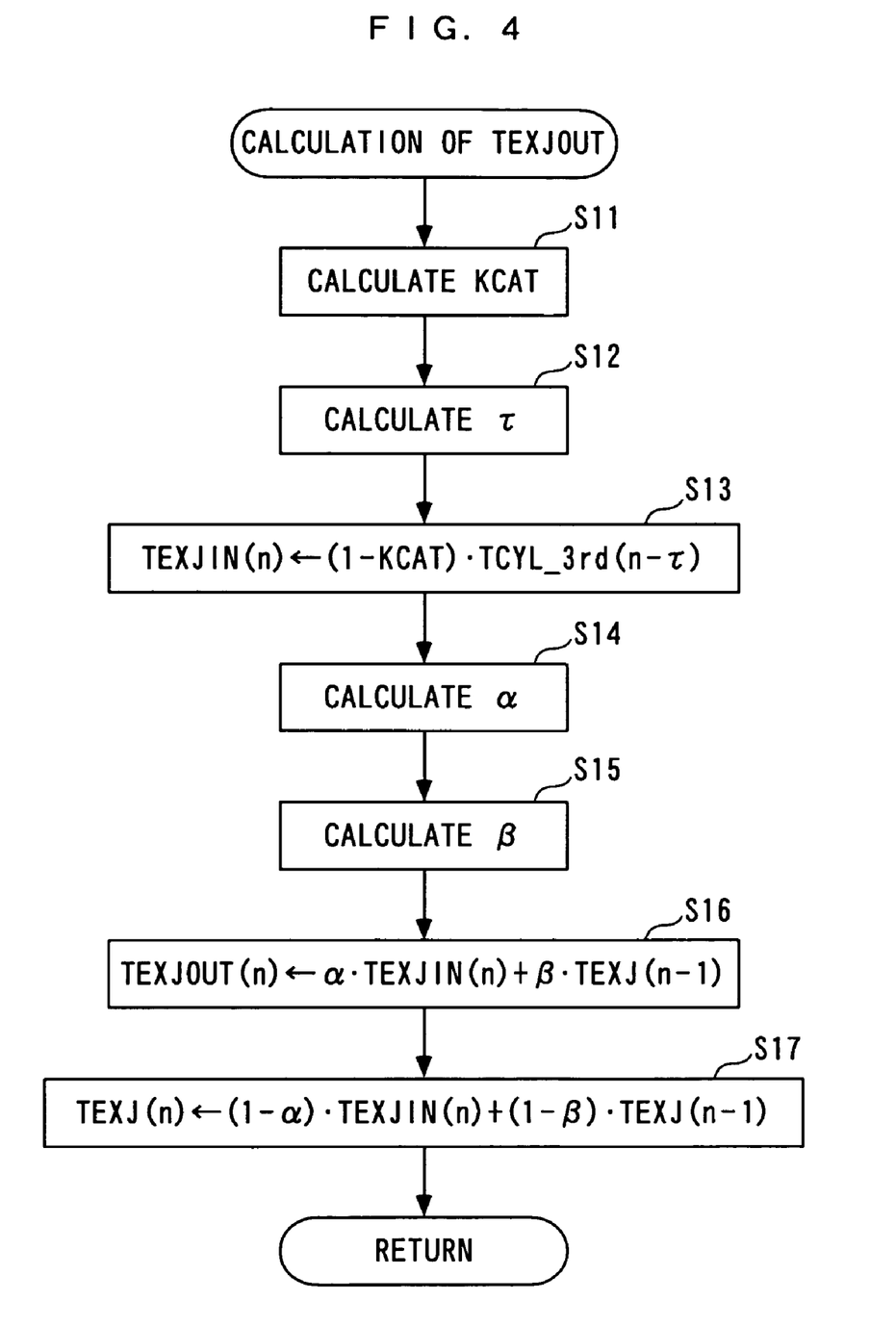
FIG. 4 is a flowchart of a subroutine for carrying out a TEXJOUT-calculating process in a step 1 in FIG. 3.

FIG. 4 shows a process for calculating the recirculation fuel amount TEXJOUT. First, in a step 11, a catalyst inflow ratio KCAT is calculated. The catalyst inflow ratio KCAT represents the ratio of the amount of fuel flowing into the catalytic device 15 to the whole amount of fuel injected during the expansion stroke (hereinafter referred to as "the expansion stroke injection fuel amount"). Specifically, the catalyst inflow ratio KCAT is calculated by searching a KCAT map shown in FIG. 5 according to the engine speed NE and the demanded torque PMCMD.

Figure 5:
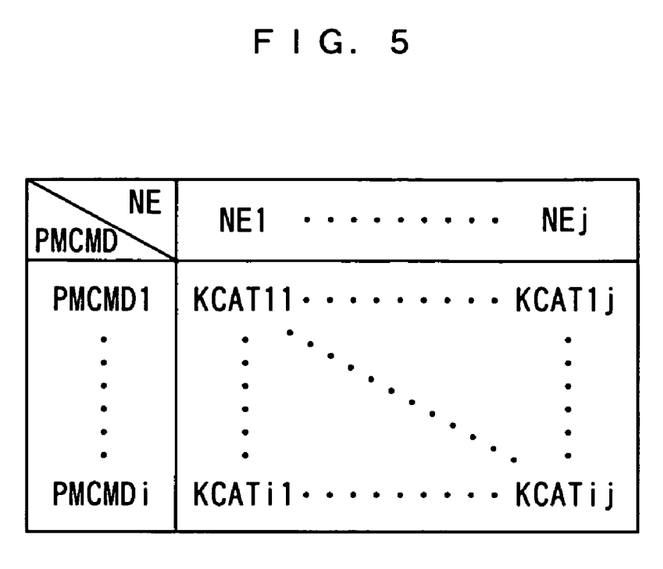
FIG. 5 is a diagram of an example of a KCAT map for use in the FIG. 4 process.

In the KCAT map, the catalyst inflow ratio KCAT is set to have a tendency reverse to that of the above-described target EGR amount with respect to the engine speed NE and the demanded torque PMCMD. More specifically, the catalyst inflow ratio KCAT is set to a relatively large value smaller than 1.0 in the aforementioned very low engine speed region, to a minimum value in the low-to-medium engine speed region, and to a larger value as the demanded torque PMCMD is larger in the medium-to-high engine speed region. This is because, as described above, the target EGR amount is a target value of the amount of exhaust gases to be recirculated to the cylinder 3a via the EGR pipe 16a, whereas the catalyst inflow ratio KCAT represents the ratio of the amount of expansion stroke injected fuel flowing into the catalytic device 15 together with exhaust gases remaining without flowing into the EGR pipe 16a, to the whole expansion stroke injection fuel amount.

Then, a dead time τ is calculated (step 12). The dead time τ represents a time period it takes for fuel injected during the expansion stroke to flow into the EGR pipe 16a after being injected, by the number of the TDC signals generated during the time period. Specifically, the dead time τ is calculated by searching a τ map shown in FIG. 6 according to the engine speed NE and the demanded torque PMCMD.

Figure 6:
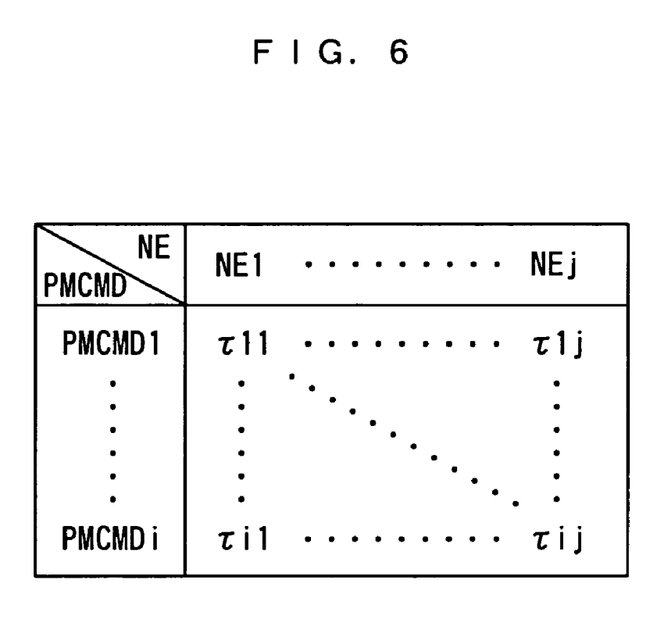
FIG. 6 is a diagram of an example of a $\tau$ map for use in the FIG. 4 process.

This map is configured such that as the engine speed NE is lower and/or the demanded torque PMCMD is larger, the dead time τ is set to a smaller value. This is because as the engine speed NE is lower, the interval at which each TDC signal pulse is generated becomes longer, and hence assuming that the flow velocity of exhaust gases is constant, as the engine speed NE is lower, the number of times of generation of each TDC signal pulse becomes smaller with respect to the same dead time. Further, the map is configured as described above because as the demanded torque PMCMD is larger, the velocity of exhaust gases is higher.

Then, an inflow fuel amount TEXJIN is calculated using the catalyst inflow ratio KCAT and the dead time τ calculated in the respective steps 11 and 12, by the following equation (1) (step 13). The inflow fuel amount TEXJIN represents the amount of expansion stroke injected fuel flowing into the EGR pipe 16a, out of the whole expansion stroke injected fuel, and TEXJIN(n) represents the current value thereof.

$$TEXJIN\ (n) = (1 - KCAT) \cdot TCYL\_3rd(n-\tau) \quad (1)$$

wherein TCYL_3rd represents an actual expansion stroke injection fuel amount, and is calculated as described hereinafter. Further, discrete data with a symbol (n) indicates that it is data calculated or sampled whenever the TDC signal pulse is generated. It should be noted that in the following description, the symbol (n) indicating that the discrete data therewith is the current value is omitted as deemed appropriate.

As is apparent from the definition of the catalyst inflow ratio KCAT described above, (1−KCAT) in the equation (1) represents the ratio of the inflow fuel amount to the expansion stroke injection fuel amount. Further, from the definition of the dead time τ, the expansion stroke injection fuel amount TCYL_3rd(n−τ) represents an amount of fuel actually injected during the expansion stroke before the dead time τ. Therefore, the current inflow fuel amount TEXJIN(n) can be properly calculated by the equation (1).

Figure 7:
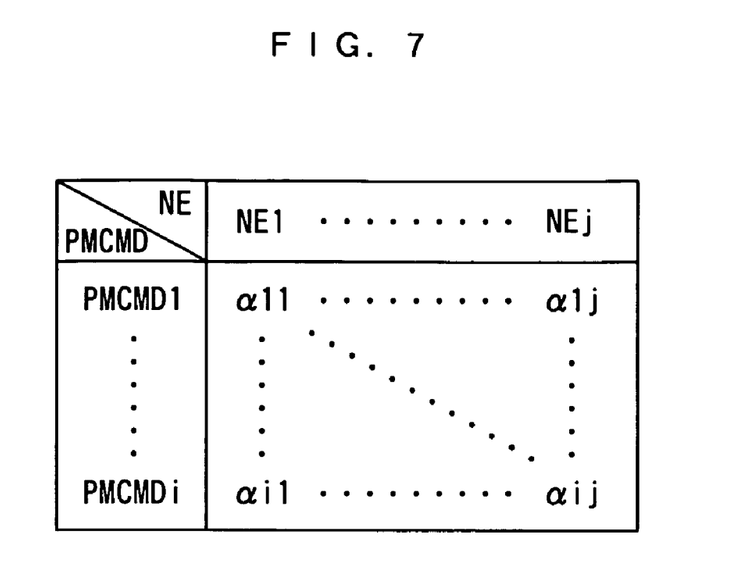
FIG. 7 is a diagram of an example of an $\alpha$ map for use in the FIG. 4 process.

Next, a direct inflow ratio α is calculated by searching an α map shown in FIG. 7 according to the engine speed NE and the demanded torque PMCMD (step 14) The direct inflow ratio α represents the ratio of the amount of fuel directly flowing into the cylinder 3a, out of the inflow fuel amount of fuel, to the inflow fuel amount.

This α map is configured such that as the engine speed NE is higher and/or the demanded torque PMCMD is larger, the direct inflow ratio α is set to a smaller value. This is because as the engine speed NE is higher and/or the demanded torque PMCMD is larger, the fresh air flow rate GIN becomes larger, and hence it is difficult for fuel having flowed into the EGR pipe 16a to directly flow into the cylinder 3a.

Figure 8:
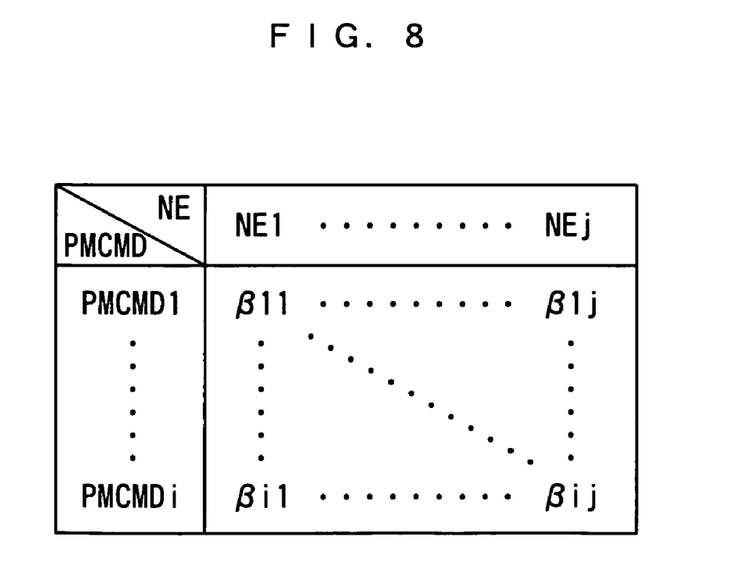
FIG. 8 is a diagram of an example of a $\beta$ map for use in the FIG. 4 process.

Then, an indirect inflow ratio β is calculated by searching a β map shown in FIG. 8 according to the engine speed NE and the demanded torque PMCMD (step 15) The indirect inflow ratio β represents the ratio of the amount of fuel flowing into the cylinder 3a, out of fuel having flowed into the EGR pipe 16a and staying in the EGR pipe 16a and the intake pipe 4 without directly flowing into the cylinder 3a (hereinafter referred to as "the staying fuel amount"), to the staying fuel amount.

This β map is configured such that as the engine speed NE is higher and/or the demanded torque PMCMD is larger, the indirect inflow ratio β is set to a smaller value. This is because as the engine speed NE is higher and/or the demanded torque PMCMD is larger, the fresh air flow rate GIN becomes larger, and hence it is difficult for fuel staying within the EGR pipe 16a to flow into the cylinder 3a directly.

Then, the recirculation fuel amount TEXJOUT is calculated using the inflow fuel amount TEXJIN(n), the direct inflow ratio α, and the indirect inflow ratio β, calculated in the respective steps 13 to 15, by the following equation (2) (step 16).

$$TEXJOUT(n) = \alpha \cdot TEXJIN(n) + \beta \cdot TEXJ(n-1) \quad (2)$$

wherein TEXJ represents the staying fuel amount.

Next, the current value TEXJ(n) of the staying fuel amount is calculated using the immediately preceding value thereof TEXJ(n−1), the inflow fuel amount TEXJIN(n), the direct inflow ratio α, and the indirect inflow ratio β, by the following equation (3) (step 17), followed by terminated the present process.

$$TEXJ(n) = (1 - \alpha) \cdot TEXJIN(n) + (1 - \beta) \cdot TEXJ(n - 1) \quad (3)$$

As is apparent from the above-described definitions of the direct inflow ratio α and the indirect inflow ratio β, in the equation (3), (1−α)·TEXJIN(n) represents the amount of fuel staying e.g. within the EGR pipe 16a, out of the current inflow fuel amount TEXJIN(n) of fuel, and (1−β)·TEXJ(n−1) represents the amount of fuel continuing to stay e.g. within the EGR pipe 16a, out of the immediately preceding staying fuel amount TEXJ(n−1) of fuel. Therefore, the current staying fuel amount TEXJ(n) can be properly calculated by the equation (3).

Referring again to FIG. 3, in a step 2 following the step 1, it is determined whether or not the expansion stroke injection flag F_EXEM is equal to 1. The expansion stroke injection flag F_EXEM is set to 1 when the executing conditions for performing the expansion stroke injection are satisfied. The executing conditions for performing the expansion stroke injection are judged to be satisfied when estimated temperature of the catalytic device 15 is not higher than a first predetermined temperature (e.g. 500° C.) when the engine is in the stratified combustion mode. It should be noted that the temperature of the catalytic device 15 is estimated based on the engine speed NE and the demanded torque PMCMD. Furthermore, expansion stroke injection is terminated when the estimated temperature of the catalytic device 15 has reached a second predetermined temperature (e.g. 600° C.) higher than the first predetermined temperature or when a predetermined time period (e.g. 1 sec) has elapsed after the start of expansion stroke injection. Along with the termination of expansion stroke injection, the expansion stroke injection flag F_EXEM is reset to 0.

If the answer to the question of the step 2 is negative (NO), i.e. if the executing conditions for performing the expansion stroke injection are not satisfied, a demanded main fuel injection amount TCYL_2ndt for use in normal operation of the engine 3 in which expansion stroke injection is not carried out is calculated by the following equation (4) (step 3):

$$TCYL\_2ndt = TIM \cdot KCMD \cdot KAF \cdot KTOTAL \quad (4)$$

The demanded main fuel injection amount TCYL_2ndt represents the amount of fuel to be burned for the engine power output and reducing exhaust emissions, as required.

In this equation (4), TIM, KCMD, KAF, and KTOTAL represent a basic fuel injection amount, a target air-fuel ratio, an air-fuel ratio correction coefficient, and a total correction coefficient, respectively. It should be noted that the basic fuel injection amount TIM is calculated according to the fresh air flow rate GIN, and the target air-fuel ratio KCMD is calculated according to the engine speed NE and the demanded torque PMCMD. The air-fuel ratio correction coefficient KAF is calculated with a predetermined feedback control algorithm such that the actual air-fuel ratio KACT becomes equal to the target air-fuel ratio KCMD. The total correction coefficient KTOTAL is calculated according to the engine coolant temperature TW, the intake air temperature TA, and the atmospheric pressure PA.

Then, an actual main fuel injection amount TCYL_2nd is calculated using the calculated demanded main fuel injection amount TCYL_2ndt and the recirculation fuel amount TEXJOUT calculated in the step 1, by the following equation (5) (step 4).

$$TCYL\_2nd = TCYL\_2ndt - TEXJOUT \quad (5)$$

The valve-opening time period and the valve-opening timing of the injector 6 are controlled according to the calculated actual main fuel injection amount TCYL_2nd.

Next, the expansion stroke injection fuel amount TCYL_3rd is set to a value of 0 (step 5), followed by terminating the present process. This inhibits expansion stroke injection.

On the other hand, if the answer to the question of the step 2 is affirmative (YES) (F_EXEM=1), i.e. if the executing conditions for performing expansion stroke injection are satisfied, a demanded main fuel injection amount (demanded combustion fuel amount) TCYL_main for an expansion stroke injection time is calculated (step 6). The demanded main fuel injection amount TCYL_main represents the amount of fuel to be burned for obtaining engine power output and reducing exhaust emissions, as required, during the expansion stroke injection time.

Figure 9:
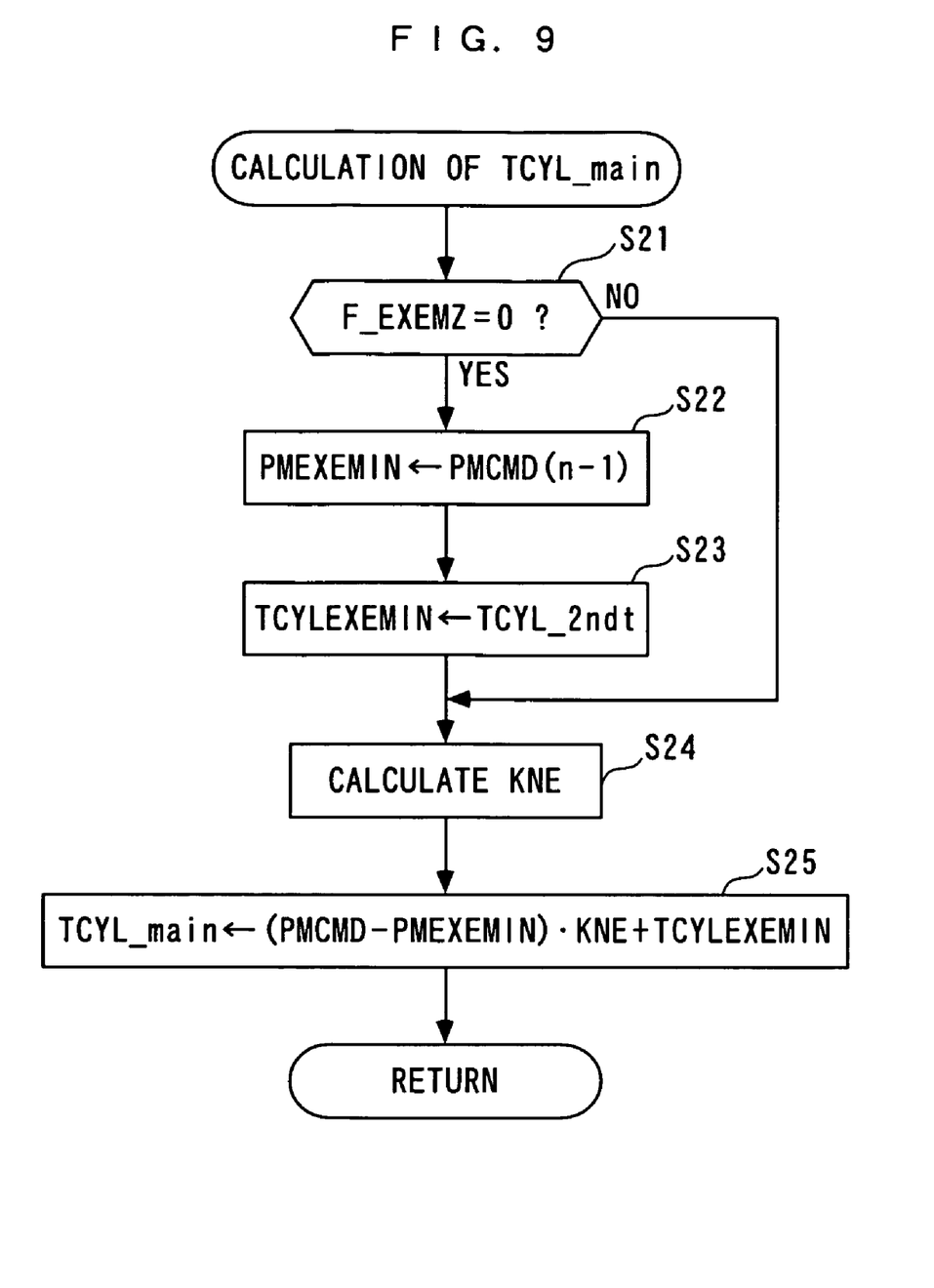
FIG. 9 is a flowchart of a subroutine for carrying out a TCYL_main-calculating process in a step 6 in FIG. 3.

FIG. 9 shows a process for calculating the demanded main fuel injection amount TCYL_main. First, in a step 21, it is determined whether or not the immediately preceding value F_EXEMZ of the expansion stroke injection flag is equal to 0. If the answer to this question is affirmative (YES), i.e. if the current loop is performed immediately after the start of expansion stroke injection, the immediately preceding value PMCMD(n−1) of the demanded torque is set to a preceding demanded torque PMEXEMIN (step 22), while the demanded main fuel injection amount TCYL_2ndt for use in the normal operation of the engine 3, calculated in the immediately preceding loop, is set to a preceding demanded fuel amount TCYLEXEMIN (step 23), followed by the process proceeding to a step 24. On the other hand, if the answer to the question of the step 21 is negative (NO), the steps 22 and 23 are skipped, and the process proceeds to the step 24.

In the step 24, a coefficient KNE is calculated by searching a map (not shown) according to the engine speed NE. This map is configured such that as the engine speed NE is higher, the coefficient KNE is set to a larger value.

Then, the demanded main fuel injection amount TCYL_main is calculated using the demanded torque PMCMD, the preceding demanded torque PMEXEMIN, the preceding demanded fuel amount TCYLEXEMIN, and the coefficient KNE calculated in the respective steps 22 to 24, by the following equation (6) (step 25), followed by terminating the present process.

$$TCYL\_main = (PMCMD - PMEXEMIN) \cdot KNE + TCYLEXEMIN \quad (6)$$

As described above, the demanded main fuel injection amount TCYL_main for the expansion stroke injection time is calculated based on the demanded main fuel injection amount TCYL_2ndt (TCYLEXEMIN) and the demanded torque PMCMD (PMEXEMIN) immediately before the start of expansion stroke injection, and according to the current demanded torque PMCMD.

Referring again to FIG. 3, in a step 7 following the step 6, the actual main fuel injection amount TCYL_2nd is calculated using the calculated demanded main fuel injection amount TCYL_main and the recirculation fuel amount TEXJOUT, by the following equation (7) (step 7).

$$TCYL\_2nd = TCYL\_main - TEXJOUT \quad (7)$$

The valve-opening time period and the valve-opening timing of the injector 6 are controlled according to the calculated actual main fuel injection amount TCYL_2nd.

Figure 10:
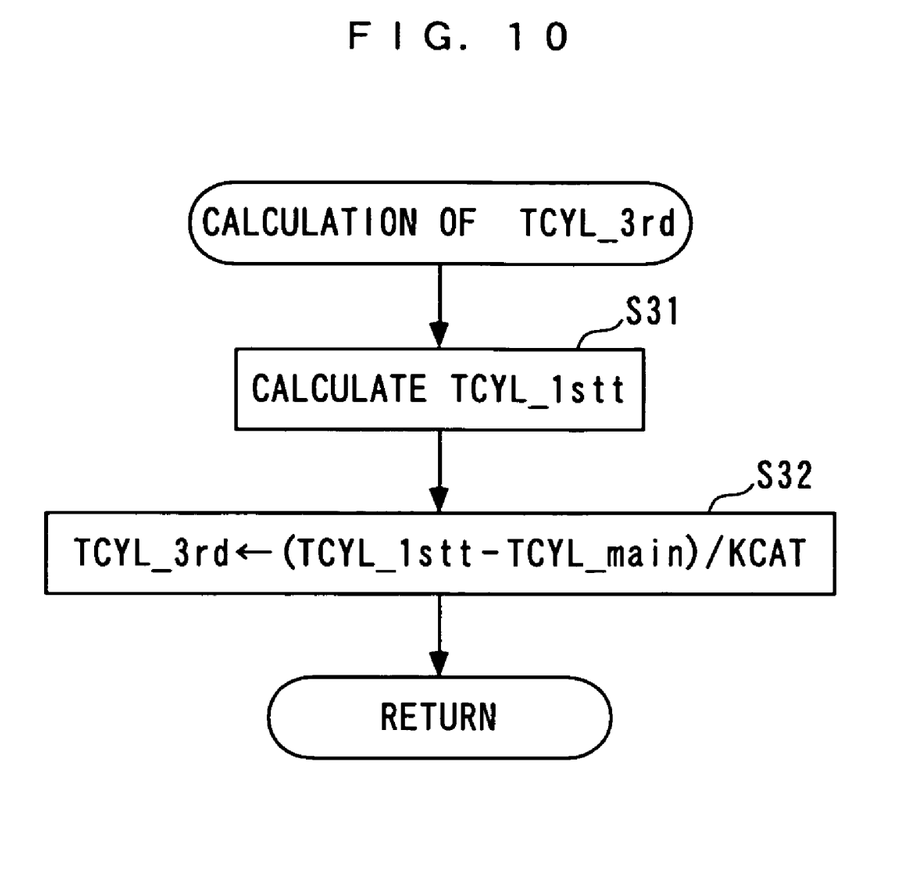
FIG. 10 is a flowchart of a subroutine for carrying out a TCYL_3rd-calculating process in a step 8 in FIG. 3.

Next, the expansion stroke injection fuel amount TCYL_3rd is calculated (step 8), followed by terminating the present process. FIG. 10 shows a process for calculating the expansion stroke injection fuel amount TCYL_3rd. First, in a step 31, a fuel amount TCYL_1stt for stoichiometric combustion is calculated. This calculation is performed using the basic fuel injection amount TIM and the total correction coefficient KTOTAL used in the step 3, by the following equation (8):

$$TCYL\_1stt = TIM \cdot KREF \cdot KTOTAL \quad (8)$$

wherein KREF represents the learned value of the air-fuel ratio correction coefficient KAF used in the step 3, which is learned when the air-fuel ratio is controlled to the stoichiometric air-fuel ratio. The learned value KREF is stored in the RAM of the ECU 2 in a manner associated with the engine speed NE and the demanded torque PMCMD, and in calculating the fuel amount TCYL_1stt for stoichiometric combustion, the learned value KREF corresponding to the engine speed NE and the demanded torque PMCMD at the time is used. Thus, the fuel amount TCYL_1stt for stoichiometric combustion is calculated such that the air-fuel ratio becomes equal to the stoichiometric air-fuel ratio.

Then, the expansion stroke injection fuel amount TCYL_3rd is calculated using the calculated fuel amount TCYL_1stt for stoichiometric combustion, the demanded main fuel injection amount TCYL_main calculated in the step 25, and the catalyst inflow ratio KCAT, by the following equation (9) (step 32), followed by terminating the present process.

$$TCYL\_3rd = (TCYL\_1stt - TCYL\_main)/KCAT \quad (9)$$

When the expansion stroke injection fuel amount TCYL_3rd is calculated as described above, the valve-opening time period and the valve-opening timing of the injector 6 are controlled such that an amount of fuel corresponding to the expansion stroke injection fuel amount TCYL_3rd is injected during the expansion stroke, whereby expansion stroke injection is performed.

The expansion stroke injection fuel amount TCYL_3rd is calculated as described above for the following reason: To quickly raise the temperature of the catalytic device 15 for activation thereof, it is effective to completely burn as much fuel as possible by the catalytic device 15 without generating unburned fuel. To this end, it is desirable to determine the amount of fuel to be burned by the catalytic device 15 such that the concentration of oxygen in exhaust gases after burning of fuel contained therein by the catalytic device 15 becomes equal to the concentration of oxygen in exhaust gases generated by burning a mixture having the stoichiometric air-fuel ratio (hereinafter referred to as "the stoichiometric oxygen concentration").

Therefore, by calculating the expansion stroke injection fuel amount TCYL_3rd, as expressed by the equation (9), such that the total sum of the amount (TCYL_3rd·KCAT) of fuel flowing into the catalytic device 15, out of the expansion stroke injection fuel amount TCYL_3rd, and the demanded main fuel injection amount TCYL_main becomes equal to the fuel amount TCYL_1stt for stoichiometric combustion, and performing the expansion stroke injection based on the expansion stroke injection fuel amount TCYL_3rd, it is possible to control the concentration of oxygen in exhaust gases after burning fuel injected during the expansion stroke in the catalytic device 15 to the stoichiometric oxygen concentration.

As described above, according to the present embodiment, the expansion stroke injection fuel amount TCYL_3rd is calculated by the equation (9) based on the difference between the fuel amount TCYL_1stt for stoichiometric combustion and the demanded main fuel injection amount TCYL_main. Therefore, the demanded main fuel injection amount TCYL_main can be properly determined as a just enough amount without being adversely affected by the expansion stroke injection fuel amount TCYL_3rd. This makes it possible to improve fuel economy and drivability. Further, the expansion stroke injection fuel amount TCYL_3rd is calculated by the equation (9) such that the concentration of oxygen in exhaust gases after burning fuel injected during the expansion stroke in the catalytic device 15 becomes equal to the stoichiometric oxygen concentration. This makes it possible to properly calculate the expansion stroke injection fuel amount TCYL_3rd as a just enough amount, and thereby raise the temperature of the catalytic device 15 for activation thereof.

Furthermore, since the switching of the combustion mode is inhibited in the step 51 during execution of expansion stroke injection, the expansion stroke injection fuel amount TCYL_3rd can be supplied as a just enough amount. This makes it possible to achieve excellent fuel economy and appropriately raise the temperature of the catalytic device 15.

Further, the demanded main fuel injection amount TCYL_main for the expansion stroke injection time is calculated by the equation (6) according to the current demanded torque PMCMD, and therefore the engine output torque can be controlled such that it corresponds to demanded torque PMCMD at the time point. Furthermore, since the demanded main fuel injection amount TCYL_main is calculated based on the preceding demanded torque PMEXEMIN and the preceding demanded fuel amount TCYLEXEMIN, it is possible to control the output torque smoothly without causing a torque step before and after the start of execution of expansion stroke injection. From the above, during time of execution of expansion stroke injection, the output torque can be properly controlled such that it corresponds to the demanded torque PMCMD, without causing any fluctuation, thereby making it possible to improve drivability.

Further, during the expansion stroke injection time, the actual main fuel injection amount TCYL_2nd is calculated by subtracting the recirculation fuel amount TEXJOUT from the demanded main fuel injection amount TCYL_main, and hence even when the external EGR is performed during execution of expansion stroke injection, a stable output torque of the engine 3 can be obtained, thereby making it possible to enhance drivability. Furthermore, since the recirculation fuel amount TEXJOUT is calculated according to the dead time τ, the direct inflow ratio α, and the indirect inflow ratio β, it is possible to properly calculate the TEXJOUT while causing an actual behavior of fuel injected during the expansion stroke to be reflected on the calculation.

Further, during the normal operation of the engine 3 other than the expansion stroke injection time, the actual main fuel injection amount TCYL_2nd is calculated by subtracting the recirculation fuel amount TEXJOUT from the demanded main fuel injection amount TCYL_2ndt. This makes it possible to properly control the engine output torque even when fuel injected during the expansion stroke continues to stay e.g. within the EGR pipe 16a after termination of expansion stroke injection.

It should be noted that the present invention is not limited to the embodiment described above, but can be practiced in various forms. For example, although in the embodiment, the combination of the three-way catalyst and the NOx adsorbing catalyst is used as the catalyst, the catalyst is not limited to this, but it may be any suitable catalyst insofar as it reduces exhaust emissions. Further, although in the embodiment, expansion stroke injection is performed so as to raise the temperature of the catalytic device 15 for activation thereof, the expansion stroke injection may be performed for other purposes insofar as it controls the catalyst to a predetermined state for causing the catalyst to exhibit its emission-reducing capability by causing fuel to be injected during the expansion stroke. For example, the expansion stroke injection may be performed for the purpose of causing a sulfur component adsorbed by the NOx adsorbing catalyst to be released therefrom. Furthermore, although in the embodiment, the expansion stroke injection for injecting fuel during the expansion stroke is performed, this is not limitative, but fuel may be injected over a predetermined time period within a time period from the expansion stroke through the exhaust stroke of the engine 3.

Further, although in the present embodiment, the EGR device including the EGR pipe 16a connecting between the exhaust pipe 5 and the intake pipe 4 is employed, by way of example, this is not limitative, but any type of EGR device may be used insofar as it recirculates exhaust gases via the EGR pipe. For example, the EGR device may be a type including an EGR pipe connecting between the exhaust pipe 5 and the cylinder 3a, or a type including an EGR pipe connecting between the cylinder 3a and the intake pipe 4. Further, although in the present embodiment, as the EGR device, the EGR device 16 is employed which recirculates part of exhaust gases into the intake pipe 4 via the EGR pipe 16a, this is not limitative, but the EGR device 16 may be replaced by a so-called EGR device of internal EGR type which causes part of combustion gases to remain in the combustion chamber 3d by advancing the valve-closing timing of the exhaust valves 9 of the engine 3, or a combination of the EGR device of external type and the EGR device of internal type.

Moreover, although in the present embodiment, as the dead time, the dead time τ is employed which it takes for fuel injected by expansion stroke injection to flow into the EGR pipe 16a after the injection. The dead time τ may be replaced by a dead time it takes for the injected fuel to be recirculated to the cylinder 3a after the injection. Further, although in the present embodiment, as the parameter for calculating the recirculation fuel amount TEXJOUT, all of the dead time τ, the direct inflow ratio α, and the indirect inflow ratio β are used, this is not limitative, but at least one of them may be used, or alternatively, a parameter other than these may be used in place thereof or in combination thereof.

Further, although in the present embodiment, the invention is applied to a gasoline engine, by way of example, this is not limitative, but it can be applied to various types of engines, such as diesel engines and engines for ship propulsion machines, such as an outboard motor having a vertically-disposed crankshaft.

It is further understood by those skilled in the art that the foregoing are preferred embodiments of the invention, and that various changes and modifications may be made without departing from the spirit and scope thereof.

What is claimed is:

1. A control system for an internal combustion engine, which carries out auxiliary fuel supply for supplying fuel to a cylinder as auxiliary fuel over a predetermined time period within a time period from an expansion stroke through an exhaust stroke of the engine, so as to control a catalyst for reducing exhaust emissions to a predetermined state for causing the catalyst to exhibit its emission-reducing capability, comprising:
   whole demanded fuel amount-calculating means for calculating a whole demanded fuel amount such that concentration of oxygen in exhaust gases becomes equal to predetermined oxygen concentration capable of controlling the catalyst to the predetermined state during execution of the auxiliary fuel supply;
   demanded combustion fuel amount-determining means for determining a demanded amount of combustion fuel to be supplied to the cylinder for a power output of the engine; and
   auxiliary fuel amount-determining means for determining an amount of auxiliary fuel based on a difference between the whole demanded fuel amount and the demanded amount of combustion fuel.

2. A control system as claimed in claim 1, wherein the engine has a plurality of combustion modes for burning mixtures having respective air-fuel ratios different from each other, and
   wherein the auxiliary fuel supply is carried out so as to raise temperature of the catalyst,
   the control system further comprising:
   operating condition-detecting means for detecting an operating condition of the engine;
   combustion mode-determining means for determining one of the combustion modes to be the combustion mode, according to the detected operating condition; and
   combustion mode switching-inhibiting means for inhibiting switching of the combustion mode by said combustion mode-determining means during execution of the auxiliary fuel supply.

3. A control system for an internal combustion engine, which supplies fuel to a cylinder and performs EGR for causing part of combustion gases generated by combustion to be present in the cylinder, by an EGR device, comprising:
   first supply fuel amount-determining means for determining an amount of first supply fuel to be supplied to the cylinder for a power output of the engine;
   second supply fuel amount-determining means for determining an amount of second supply fuel to be supplied to the cylinder over a predetermined time period within a time period from an expansion stroke through an exhaust stroke of the engine;
   additional fuel amount-calculating means for calculating an amount of fuel which is caused to be present in the cylinder in accordance with the EGR performed by the EGR device, out of the supplied second supply fuel, as an additional fuel amount; and
   correction means for correcting the determined amount of the first supply fuel based on the calculated additional fuel amount.

4. A control system as claimed in claim 3, further comprising dynamic characteristic parameter-calculating means for calculating a dynamic characteristic parameter indicative of dynamic characteristics exhibited by the second supply fuel supplied to the cylinder until the second supply fuel is caused to be present in the cylinder,
   wherein said additional fuel amount-calculating means calculates the additional fuel amount based on the calculated dynamic characteristic parameter.

5. A control system as claimed in claim 4, wherein the EGR device is formed by an external EGR device which executes external EGR for recirculating part of combustion gases emitted from the engine into the cylinder via an EGR passage,
   wherein the dynamic characteristic parameter includes at least one of dead time it takes for the second supply fuel to be recirculated to the cylinder, a direct inflow ratio which represents a ratio of an amount of fuel which is directly recirculated into the cylinder, out of the second supply fuel having flowed into the EGR passage, to the amount of the second supply fuel having flowed into the EGR passage, and an indirect inflow ratio which represents a ratio of an amount of fuel which is recirculated into the cylinder, out of the second supply fuel staying within the EGR passage, to the amount of the second supply fuel staying within the EGR passage.

* * * * *